(12) United States Patent
Garcia (10) Patent No.: US 10,820,748 B1
(45) Date of Patent: Nov. 3, 2020

(54) TEA STEEPING AND DISPENSING APPARATUS AND METHOD

(71) Applicant: REPTURA, LLC, Bentonville, AR (US)

(72) Inventor: Jorge Bolado Garcia, Rogers, AR (US)

(73) Assignee: Reptura, LLC, Bentonville, AR (US)

( * ) Notice: Subject to any disclaimer, the term of this patent is extended or adjusted under 35 U.S.C. 154(b) by 0 days.

(21) Appl. No.: 16/244,995

(22) Filed: Jan. 10, 2019

(51) Int. Cl.
*A47J 31/06* (2006.01)
*A47J 31/52* (2006.01)

(52) U.S. Cl.
CPC ........... *A47J 31/52* (2013.01); *A47J 31/0615* (2013.01); *A47J 31/0647* (2013.01); *A47J 31/0663* (2013.01)

(58) Field of Classification Search
CPC ............... A47J 31/0573; A47J 31/0605; A47J 31/0615; A47J 31/0636; A47J 31/0647; A47J 31/0663
USPC ......... 99/299, 306, 305, 283, 319, 320, 322, 99/315, 303
See application file for complete search history.

(56) References Cited

U.S. PATENT DOCUMENTS

| | | | | |
|---|---|---|---|---|
| 240,402 | A * | 4/1881 | Gee | A47J 31/0647 |
| 1,792,218 | A * | 2/1931 | Forman | A47J 31/0631 |
| | | | | 99/306 |
| 1,836,541 | A * | 12/1931 | Meyer | A47J 31/02 |
| | | | | 99/306 |
| 4,027,582 | A * | 6/1977 | O'Connell | A47J 31/02 |
| | | | | 99/306 |
| 4,206,694 | A * | 6/1980 | Moskowitz | A47J 31/0647 |
| | | | | 99/295 |
| 6,526,872 | B2 * | 3/2003 | Wong | A47J 31/053 |
| | | | | 99/282 |
| 6,964,222 | B1 * | 11/2005 | Tucker | A47J 31/057 |
| | | | | 99/281 |
| 8,453,561 | B2 * | 6/2013 | Ferraris | A47J 31/4482 |
| | | | | 99/284 |
| 2005/0120884 | A1 * | 6/2005 | Kerner | A47G 21/106 |
| | | | | 99/275 |
| 2010/0166928 | A1 * | 7/2010 | Stamm | A23F 3/18 |
| | | | | 426/435 |
| 2018/0000278 | A1 * | 1/2018 | Krinitchko | A23F 3/18 |

FOREIGN PATENT DOCUMENTS

| | | | | |
|---|---|---|---|---|
| DE | 2428165 A1 * | 1/1976 | | A47J 31/0615 |
| DE | 3512920 A1 * | 1/1986 | | A47J 31/52 |

\* cited by examiner

*Primary Examiner* — Reginald Alexander
(74) *Attorney, Agent, or Firm* — Dennis D. Brown; Brown Patent Law, P.L.L.C.

(57) ABSTRACT

An automatic apparatus and method for steeping tea which can (i) precisely and automatically control the temperature of the steeping water and the manner in which the water contacts the tea, (ii) retain the tea in a submerged position in the apparatus below the predetermined steeping level of the steeping water, (iii) optimally determine and control the steeping time, (iv) automatically dispense the steeped syrup when the steeping time and process are complete, (v) automatically notify the user of the status of the process, and (vi) provide and accommodate interchangeable steeping chambers formed of different materials which can be selected to provide optimum results for the particular teas chosen by the user, and to enhance the tea making process, as well as serving a decorative function.

3 Claims, 9 Drawing Sheets

TEA STEEPING AND DISPENSING APPARATUS AND METHOD

FIELD OF THE INVENTION

The present invention relates to automatic apparatuses and methods for steeping tea and for dispensing the tea after it is steeped.

BACKGROUND OF THE INVENTION

Making tea is a complicated process that requires close supervision to achieve proper results. If the water is too hot, the tea will be damaged and the flavor will be bitter. If the tea is steeped too long, it will also damage the tea negatively, impacting the flavor. If the tea is steeped in water that is not hot enough or it is not steeped long enough, it will be weak and under developed. Ideally, the water will be heated in a kettle and monitored with a thermometer to determine when the water reaches the right temperature. The water is then poured into another container having a filter therein in which the tea is held. The user must monitor the steeping process so that the tea can be removed from the steeping container at the proper time. This process results in many items having to be cleaned.

A challenge for automating the tea steeping process is that the time to steep the tea does not change with the amount of tea that is made. This is a challenge when constructing a steeping machine that can make an 8 oz serving or 24 oz serving. The time that it takes to fill the steeping chamber can be greater than the total steeping time and the apparatuses and methods heretofore used in the art have not been effective for properly controlling the contacting time of the water with the tea.

Our understanding of the health benefits of tea continues to grow. Studies show that tea may help with heart health, cancer, diabetes, neurological decline, weight loss, bone health, and other health issues.

The tea making process and its enjoyment around the world are filled with ceremony and tradition and are usually a shared experience. In the United States, tea drinking is relatively new and it is not steeped in tradition. Many times, the tea is consumed by an individual and it is not a shared experience. This difference in the way that tea is consumed in the US has resulted in the large ready-to-drink category of products, and also in the large penetration of bagged tea instead of loose tea. Another difference in the way tea is consumed in the United States is that a large percentage of the tea is iced when consumed. It is a recent development that hot loose leaf tea has begun to penetrate the US market. This change is being driven by millennials who are embracing the health benefits of tea.

When considering the US market where nearly half of the tea sold is in bag form and that steeping times for bagged tea are longer than when brewing loose leaf tea, there is a need for an automated steeper that can handle the difference in the times for steeping loose leaf tea and bagged tea.

Another consideration when brewing bagged tea is that the bags trap air and float, and therefore do not achieving optimal contact between the hot water and the tea. This tendency for bagged tea to float has created a need for a more effective means for ensuring that the tea in the filter will remain submerged in the water. When brewing different amounts of tea, there will also be a need to use more than one bag. It will therefore also be preferred that the means for keeping the tea bags submerged will be adjustable for retaining a larger amount of loose tea or a greater number of tea bags.

There are many different types of tea pots which are used around the world for brewing tea. Some are made in regions which are famous for making tea pots, for example, clay pots from Yixing China. Teapots are also decorative, being made in many different shapes and colors. They may also be decorated with patterns which are printed or embossed. Drinking tea can be a very personal experience.

There is therefore a need for a tea maker which is convenient to use but one that can make good quality tea. Tea steeping time and temperature would also preferably be controlled to assure the quality of the tea. Additionally, the steeping time would preferably be adjustable to compensate for varying types of teas and whether the tea is bagged or not. The improved tea maker would also preferably be better suited for the lifestyle of the American customer rather than the ceremonial use that is traditional in other parts of the world.

There is also a need to develop a filter that has the ability to maintain the tea, whether it is bagged or not, submerged in the water during the steeping process.

There is also a need to maintain the healthy qualities of the tea. In this regard, it would be preferred that the tea not be contaminated during the steeping processes with chemicals or residues that may leach out of some plastics or other materials used for fabricating steeping chambers. For this reason, there is a need for a steeping apparatus and method which would provide safe, interchangeable steeping chambers fabricated from different materials (clay, glass, ceramic, etc.) which are suitable for use with the various teas in the market and which would not give off any chemical substances or residues which would contaminate the tea during the steeping process.

There is also a need and opportunity to recreate the experience of making tea using tea pots made from famous locations and by famous artists by providing a removable steeping chamber which has an added decorative element and is manufactured from the same materials as used by artisan tea pot makers from around the world.

SUMMARY OF THE INVENTION

The present invention satisfies the needs and alleviates the problems discussed above.

In one aspect, there is provided a novel apparatus and method for controlling water temperature and steeping time and dispensing the tea after it is steeped, and which also preferable extends to the containment material which is selected and used to form the steeping chamber. The water temperature will preferably be automatically controlled by adjusting the flow rate of the water through a heater, and/or by automatically controlling the power or wattage of the heater. This control of water flow and/or heater power will enable the device to provide water at precise and accurate temperatures. The temperature controlled water will preferably flow into a steeping chamber in which a filter element will be used to hold the tea in place and allow proper steeping to occur. The steeping apparatus will preferably include a timer that will either notify the user that the steeping time is complete or will automatically activate a valve that will dispense the steeped tea into a glass, cup, mug, or tea pot. The steeping apparatus will also preferably include a removable and/or interchangeable steeping chamber which can be made of different materials which will enhance the tea making process, as well as serving a decorative function.

In another aspect, there is provided an apparatus for steeping tea which preferably comprises: (a) a housing having a water reservoir and a water heater therein; (b) a pump in the housing which pumps water from the water reservoir through the water heater to a heated water discharge; (c) a steeping chamber which is positioned or positionable beneath the heated water discharge; and (d) a filter element having an opening for receiving loose tea or one or more tea bags and the filter element also having a lower end. The filter element is receivable in an interior of the steeping chamber and the steeping chamber has a fill level for the water discharged from the heated water discharge, the fill level of the steeping chamber being spaced above the lower end of the filter element.

In another aspect, the inventive apparatus can further be configured wherein the lower end of the filter element is spaced above an interior bottom surface of the steeping chamber and least a lower portion of the filter element has perforations or other openings therein which will allow the water to flow into and out of the filter element but will retain loose tea or tea bags placed in the filter element.

In another aspect, the inventive apparatus can alternatively or additionally comprise a holding member in the filter element, the holding member being adjustable to a selected vertical height to prevent the loose tea or tea bags in the filter element below the holding member from floating upwardly beyond the selected height.

In another aspect, the inventive apparatus can alternatively or additionally be configured such that (i) the opening of the filter element for receiving the loose tea or one or more tea bags is an upper opening and (ii) the upper opening of the filter element is positioned away from the heated water discharge such that heated water from the heated water discharge does not flow into (i.e., bypasses) the upper opening of the filter element as the heated water flows into the steeping chamber.

In another aspect, the inventive apparatus can alternatively or additionally include a control system in the housing, the control system including a sensor which senses a temperature of or pertaining to a heated water stream produced by the water heater. The control system will preferably also control the temperature of the heated water stream in accordance with one or more predetermined temperature values or procedures. More preferably, the control system will control the temperature of the heated water stream by (i) controlling the speed of the water pump, (ii) controlling the electric current delivered to the water heater, (iii) activating or shutting off individual ones of a plurality of heating elements of the water heater, (iv) cycling power to the water heater on and off, or (v) a combination thereof.

In another aspect, the inventive apparatus can alternatively or additionally be configured such that: (i) the steeping chamber is a first interchangeable steeping chamber which is removably positionable beneath the heated water discharge; (ii) the first interchangeable steeping chamber is formed of a first material having a first coefficient of thermal expansion; (iii) the apparatus further comprises a second interchangeable steeping chamber which is removably positionable beneath the heated water discharge; (iv) the second interchangeable steeping chamber is formed of a second material having a second coefficient of thermal expansion which is different from the first coefficient of thermal expansion of the first material; and (v) the apparatus further comprising a holding member which is removably receivable on an upper end of the first interchangeable steeping chamber and on an upper end of the second interchangeable steeping chamber. The holding member is preferably configured to both (a) accommodate the first coefficient of thermal expansion of the first material to hold the first interchangeable steeping chamber in position beneath the heated water discharge and (b) accommodate the second coefficient of thermal expansion of the second material to hold the second interchangeable steeping chamber in position beneath the heated water discharge when the second interchangeable steeping chamber is interchanged with the first interchangeable steeping chamber.

In another aspect, there is provided a method for steeping tea which preferably comprises the steps of: (a) heating a water stream to produce a stream of steeping water; (b) positioning a filter element having loose tea or one or more tea bags therein in a steeping chamber; and (c) filling the steeping chamber with the steeping water to a steeping level which is spaced above the bottom of the filter element and is at least as high as an upper level of the loose tea or one or more tea bags in the filter element.

In another aspect, the inventive method can also be conducted such that: the bottom of the filter element is spaced at a bottom level above an interior bottom surface of the steeping chamber;
the steeping water does not contact the loose tea or one or more tea bags until the steeping water reaches at least the bottom level of the filter element; and as the steeping water in the steeping chamber rises from the bottom level of the filter element to the steeping level, the steeping water flows, via perforations or other openings in the filter element, into the filter element and into contact with the loose tea or one or more tea bags in the filter element.

In another aspect, the inventive method can additionally or alternatively include the steps of: (i) discharging the stream of steeping water produced in step (a) downwardly from a water discharge into a top opening of the steeping chamber, the top opening of the steeping chamber being positioned beneath the water discharge and (ii) positioning the filter element having the loose tea or one or more tea bags therein in the steeping chamber such that a top opening of the filter element is not positioned beneath the water discharge and the stream of steeping water does not flow into (i.e., bypasses) the top opening of the filter element.

In another aspect, the inventive method can additionally or alternatively include the step of positioning a holding member in the filter element above the loose tea or one or more tea bags which prevents the loose tea or one or more tea bags in the filter element from floating to a level above the holding member as the steeping water rises in the steeping chamber to the steeping level.

In another aspect of the inventive method, the water stream can alternatively or additionally be heated in step (a) to produce the stream of steeping water by using a pump to pump the water stream through a water heater and the method can further comprise the step of controlling a temperature of the steeping water by (i) controlling a speed of the pump, (ii) controlling an electric current delivered to the water heater, (iii) activating or shutting off individual ones of a plurality of heating elements of the water heater, (iv) cycling power to the water heater on and off, or (v) a combination thereof.

In another aspect, the inventive method can alternatively or additionally include the step, when a steeping time for the loose tea or one or more tea bags expires, of automatically activating an audible indicator, automatically activating a visual indicator, automatically sending a wireless message, automatically opening a product flow outlet of the steeping chamber, or a combination thereof.

In another aspect, the inventive method can alternatively or additionally include the step of holding the steeping water at the steeping level in the steeping chamber until a steeping time is completed, wherein the steeping time begins when the steeping water in the steeping chamber is at or above a lower end of the filter element.

In another aspect, for implementing a short steeping time or for other purposes, the inventive method can alternatively or additionally include the step of automatically at least partially opening a discharge of the steeping chamber during a portion of step (c) while filling the steeping chamber with the steeping water.

In another aspect, the inventive method can alternatively or additionally include: the loose tea or one or more tea bags comprising a first type of tea; the steeping chamber being a first interchangeable steeping chamber formed of a first material; the method further comprising the step of selecting the first interchangeable steeping chamber for steeping the loose tea or one or more tea bags comprising the first type of tea; and the method additionally comprising, after step (c), steeping loose tea or one or more tea bags comprising a second type of tea, different from the first type of tea. The steeping of the loose tea or one or more tea bags comprising the second type of tea will preferably be performed by; (i) heating additional water to produce a second amount of steeping water; (ii) selecting a second interchangeable steeping chamber for steeping the loose tea or one or more tea bags comprising the second type of tea, the second interchangeable steeping chamber being formed of a second material which is different from the first material; (iii) removing the filter element from the first interchangeable steeping chamber and removing the loose tea or one or more tea bags comprising the first type of tea from the first interchangeable steeping chamber; (iv) putting the loose tea or one or more tea bags comprising the second type of tea in the filter element; (v) positioning the filter element in the second interchangeable steeping chamber; and (vi) filling the second interchangeable steeping chamber with the second amount of steeping water to a steeping level which is higher than the bottom level of the filter element and is at least as high as an upper level of the loose tea or one or more tea bags comprising the second type of tea in the filter element.

Further objects, features and advantages of the present invention will be apparent to those in the art upon examining the accompanying drawings and upon reading the following Detailed Description of the Preferred Embodiments.

BRIEF DESCRIPTION OF THE DRAWINGS

Some embodiments of the present invention are illustrated as examples and are not limited by the figures of the accompanying drawings, in which like references may indicate similar elements.

DETAILED DESCRIPTION OF THE PREFERRED EMBODIMENTS

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in the specification, are open ended terms which specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressed so defined herein.

In describing the invention it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

New automatic steeping apparatuses and methods, control devices, mechanisms and steeping chambers, and other features and components for the preparation of tea are discussed herein. In the following description, for the purpose of explanation, numerous specific details are set forth in order to provide a thorough understanding of the present invention. It will be evident, however, to one skilled in the art that the present invention may be practiced with or without specified details.

The present disclosure is to be considered as an exemplification of the invention and is not intended to limit the invention to the specific embodiments illustrated by figures or described herein.

For the purpose of this disclosure the term "brewing" will be considered a special case of the term "steeping." The term steeping will be used to describe the process for extracting the solids from tea leaves, whether loose or in bags, contacting loose tea leaves or tea bags with hot water in a steeping chamber where the leaves will preferably be in contact with the water for an amount, preferably a predetermined amount, of time. The resulting solids extracted from the tea leaves combined with the water will be referred to as syrup. After the syrup has completed the holding time, it will be separated from the loose leaves or tea bags. The term brewing is a condition where the steeping time is limited to the time it takes to dispense the water over the tea leaves and for the syrup to drain through an opening in the holding chamber. There is no holding time.

It will also be understood that, unless otherwise stated, the term "steeping chamber" as used herein and in the claims can refer to any type of container in which the steeping of tea is performed.

Figure 1:
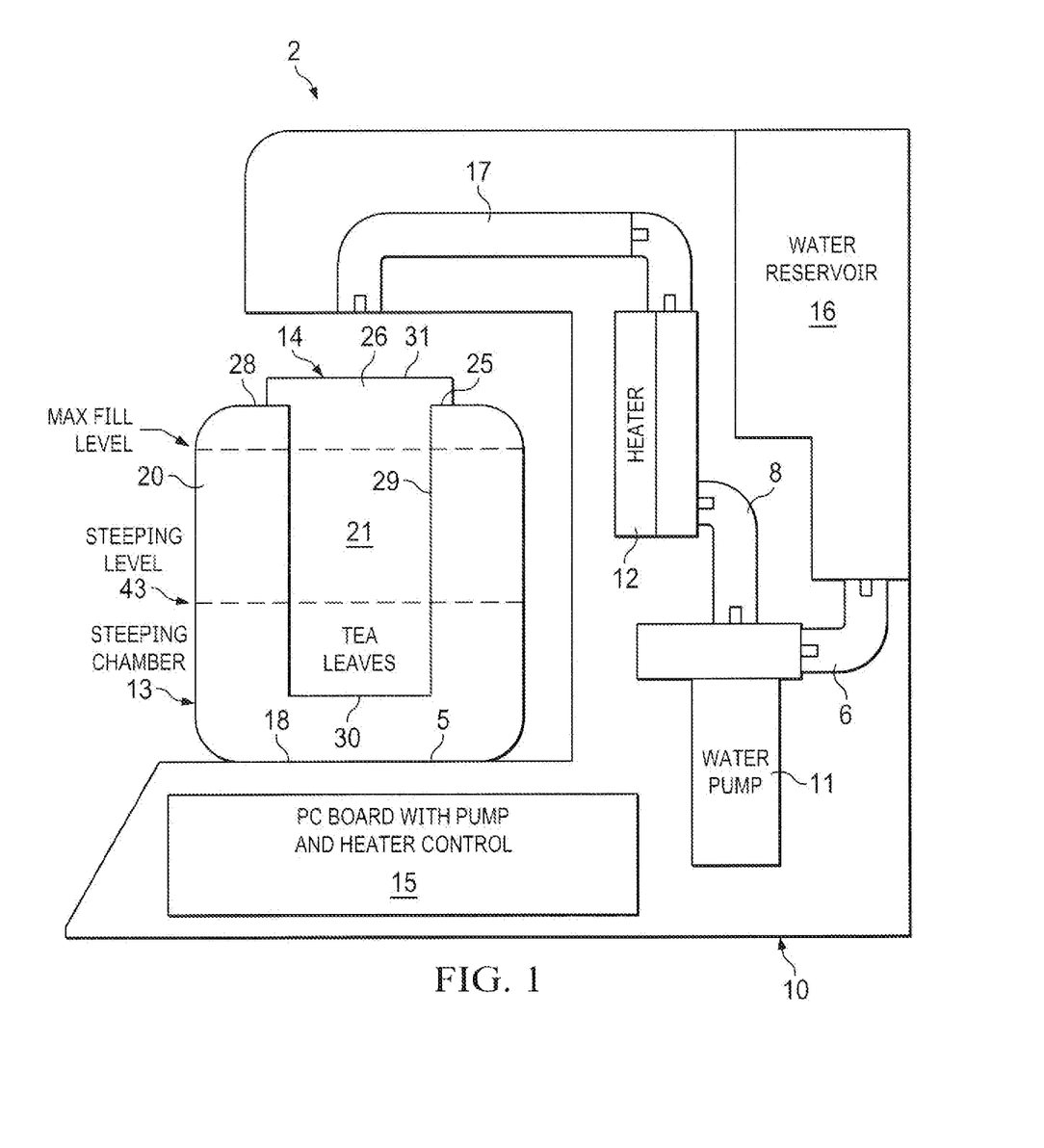
FIG. 1 depicts a first embodiment 2 of the automatic steeping apparatus which heats the water and dispenses it into a steeping chamber 13 which holds a filter element 14 containing tea leaves or tea bags.

The present invention will now be described by referencing the appended figures representing preferred embodiments. FIG. 1 depicts an embodiment 2 of the inventive automatic steeping apparatus 2. The inventive steeping apparatus 2 comprises a housing 10 having a water reservoir 16, a water pump 11, and a water heater 12 located therein. A pump suction tube or other conduit 6 is connected between the bottom of the water reservoir 16 and the suction inlet of the pump 11 and a pump discharge tube or other conduit 8 is connected between the discharge outlet of the pump 11 and the water heater 12. The housing 10 also comprises a platform or stand 5 for removably holding a steeping chamber 13 in position for receiving the heated steeping water. In this and other embodiments, the pump 11 will preferably be a variable flow rate pump which will control the flow of water through the heater assembly 12, which can have a defined or variable power or wattage.

The combination of flow rate and heater power will define the temperature of the water stream when it reaches the steeping chamber 13. In the steeping chamber 13, a filter element 14 for the loose tea or tea bags is preferably received such that the bottom 30 of the filter element 14, and the tea or tea bags held within the filter element 14, are spaced at an elevated position above the interior bottom surface 18 of the steeping chamber 13. It will be understood, however, that the bottom 30 of the filter element 14 can alternatively rest on or be positioned substantially on the interior bottom surface 18 of the steeping chamber 13.

The filter element 14 can be removed from the steeping chamber 13 as needed for adding, removing, or replacing the tea or tea bags and for cleaning the filter element 14. Examples of suitable materials for forming the filter element 14 include, but are not limited to, stainless steel or glass. The filter element 14 preferably further comprises: an upwardly extending side enclosure 29 which laterally surrounds the interior 21 of the filter element 14; an open upper end 31; and an outwardly extending upper radial shoulder 25 which surrounds the open upper end 31 of the filter element 14. The filter element 14 is received in a top opening 26 of the interior 20 of the steeping chamber 13 such that (a) the upper radial shoulder 25 of the filter element 14 rests on an upper surface 28 of the steeping chamber 13 which surrounds the top opening 26 of the steeping chamber 13 and (b) the bottom 30 of the filter element 14 is preferably thereby retained at a position within the steeping chamber 13 such that the bottom 30 of the filter element 14 is spaced a sufficient distance above the interior bottom surface 18 of the steeping chamber 13 such that the volume of the interior 20 of the steeping chamber 13 below the level of the bottom 30 of the filter element 14 is a least 2 ounces and is more preferably about 4 ounces.

Figure 10:
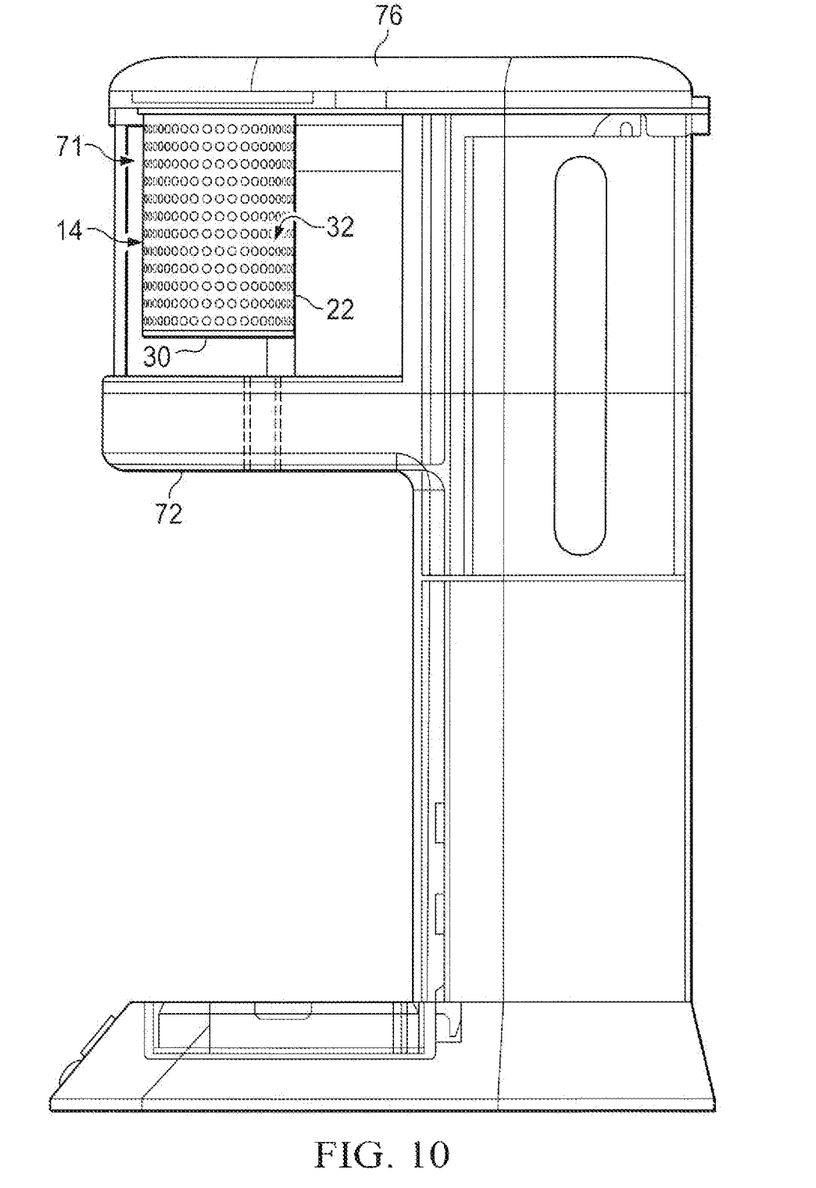
FIG. 10 is a cutaway elevational side view of the inventive automatic steeping apparatus 70.

As illustrated in FIG. 10, perforations or other openings 32 are provided through the bottom 30 and/or at least the lower portion of the upwardly extending side enclosure 29 of the filter element 14. The perforations 32 are sized for straining the tea such that the loose tea or tea bags in the filter element 14 will be retained in the filter element 14 as the steeping water flows into and out of the filter element 14 via the perforations 32.

In this and other embodiments of the automatic steeping apparatus and method, a controller 15 is preferably provided in the housing 10 for activating the water pump 11, activating the water heater 12 for heating the flow of steeping water, and shutting the pump 11 and the heater 12 off when a selected and/or predetermined amount of heated steeping water has been delivered to the steeping chamber 13.

Figure 4:
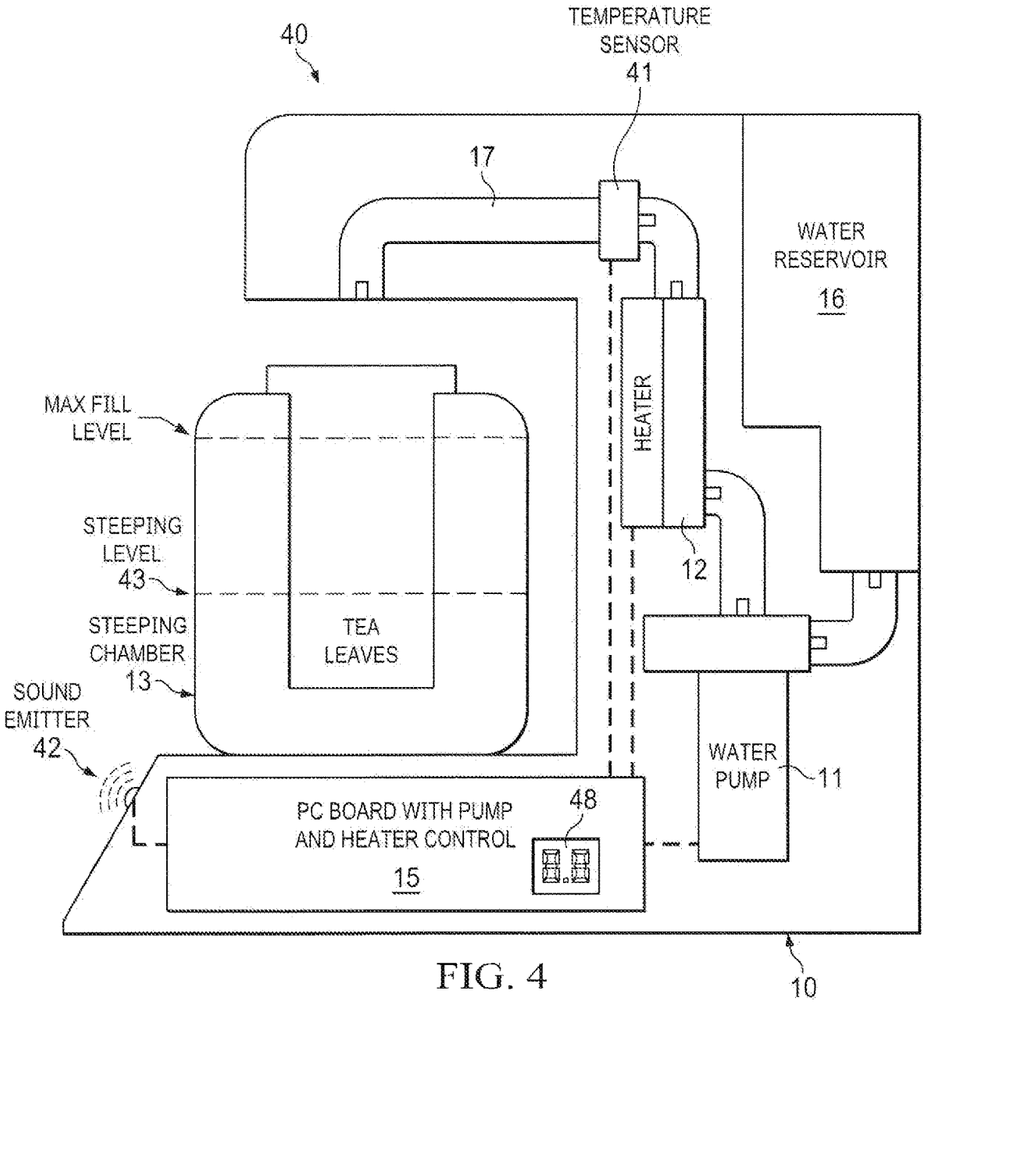
FIG. 4 depicts a second embodiment 40 of the automatic steeping apparatus which includes a temperature sensor 41 and an audible and or visible emitter 42.
Figure 12:
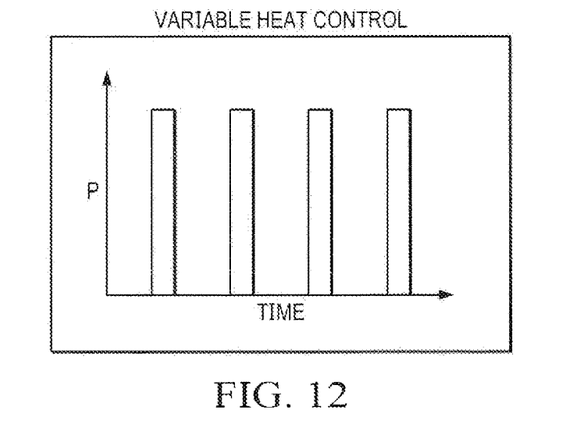
FIG. 12 is a chart depicting the use of an inventive technique of cycling the power "P" to the water heater 12 of the automatic steeping apparatus on and off in rapid succession over time in order to control the temperature of the steeping water stream.

In an alternative embodiment 40 of the inventive steeping apparatus illustrated in FIG. 4, the steeping apparatus 40 also includes a temperature sensor 41 positioned, for example, in the discharge conduit 17 of the heater 12 for monitoring the temperature of the heated steeping water and providing a continuous or periodic temperature reading to the controller 15. Using the temperature reading provided by the sensor 41, the controller 15 can also be programmed to control and/or change the temperature of the heated steeping water by controlling the speed of the variable speed pump 11, controlling the electrical current delivered to the water heater 12, activating or shutting off individual heater elements or stages, cycling the power supply to the water heater on and off in rapid succession as illustrated in FIG. 12, or a combination thereof.

The temperature sensor 41 and control system 15 can additionally be used for detecting and compensating for such things as low beginning water temperatures, fluctuations in the input voltage, tolerances of the material of a selected interchangeable steeping chamber or of other components, and other factors which can influence the performance of the system. In addition to or as an alternative for sensing the temperature of the heated water leaving the heater 12, other sensors can be used to measure the wall temperature of the heater discharge conduit 17 and/or the water temperature at the water reservoir 16. The location(s) of the sensor(s) and the particular temperature readings which are taken and used to improve the performance of the system should not be limited to the embodiments illustrated.

The controller 15 will preferably comprise: a microcontroller or any other suitably sized CPU or other processing board or unit; a user interface 48 (e.g., a touch pad or key pad, one or more buttons, knobs, switches, or a combination thereof, a Bluetooth, Wi-Fi, infrared, radio frequency and/or other wireless receiver and/or transmitter of any desired type for communicating with a smart phone, remote control, or other hand-held or mobile device, a combination thereof, or any other desired interface) (see, e.g., FIG. 7); a digital or other display; and/or any other device or component suitable for activating the system, selecting among predetermined operating and tea making options, inputting set points or instructions (e.g., for defining the steeping temperature for the particular tea selected), monitoring the system, receiving status and other operating information and updates, etc.

Figure 2:
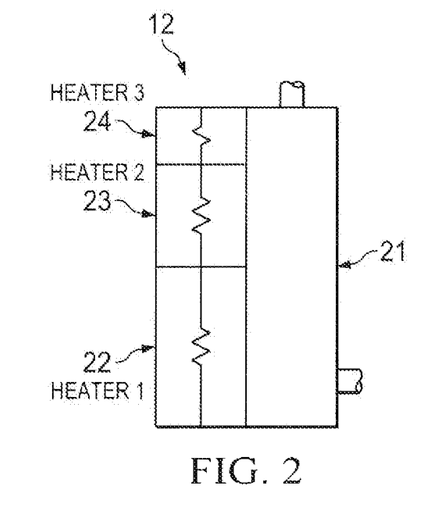
FIG. 2 depicts an embodiment 12 of a water heater, used in the inventive steeping apparatus, where three heating elements 22, 23, 24 are used to achieve different temperatures.

FIG. 2 illustrates an embodiment of the heater system 12 which preferably comprises (a) a metal tube or other conduit 21 for the water and (b) a series of two or more, preferably three, electrical or other heating elements 22, 23, and 24. The heating elements 22, 23, and 24 can be positioned within the metal conduit 21, around or partially around the metal conduit 21, or welded adjacent to the metal conduit 21. The heating elements 22, 23 and 24 can be energized one at a time, simultaneously, or in any desired combination or sequence. The heating elements 22, 23, and 24 can be identical or can be of different sizes or power levels and/or otherwise provide different heat outputs. As illustrated in FIG. 2, the first heating element 22 will preferably be sized or otherwise configured to provide the greatest heat output and the second heating element 23 will preferably be sized or otherwise configured to provide less heat output than the first heating element 22 but more heat output than the third heating element 24.

Figure 3:
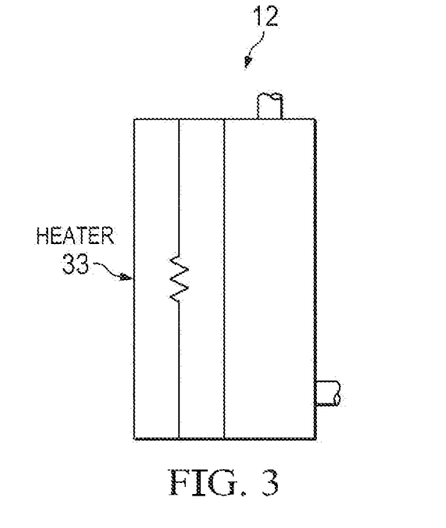
FIG. 3 depicts an alternative embodiment of the water heater 12 having a single heating element 33, wherein various heating levels are achieved, for example, by using a control device which cycles power to the heating element 31 on and off in rapid succession.

FIG. 3 illustrates an alternative embodiment of the heater system 12 comprising a single heater element 33 which can be cycled on and off by the control system 15, as illustrated in FIG. 12, to achieved a desired average power. The rate at which the controller 15 pulses the power to the element 33 on an off can be changed and controlled to achieve multiple different heating power levels. The variation of heating power level can also be combined with controlled changes in the rate of flow of the water from the water pump 11 to provide even greater improvements in water temperature precision and accuracy.

The embodiment 40 of the inventive steeping apparatus illustrated in FIG. 4 also includes a sound emitter, light, and/or other audible or visible indicator 42 which is activated by the controller 15 to notify the user that the steeping cycle is complete and that the tea leaves are ready to be removed from the steeping chamber 13. In addition, or in the alternative, any number of other devices or methods (e.g., an LED or digital display, a message sent to a smart phone, remote, or other mobile device, etc.) can be used to notify the user that the steeping cycle is complete.

To improve the steeping cycle, the amount of time for which the tea leaves are held in hot water can be adjusted so that the timed steeping period does not begin until the water level in the steeping chamber 13 has reached or exceeds a predetermined steeping level 43 as illustrated in FIG. 4. The steeping level 43 will preferably be the water level at which all of the leaves or tea bags in the filter element 14 are covered with hot water so that an optimal extraction of the steeping syrup product from the tea can begin. The control system 15 will preferably offset or adjust any steeping time which is set by the user in order to compensate for the time that it takes for the steeping water to reach the steeping level 43. The time to reach the steeping level 43 may not be constant due, for example, to controlled changes in the water flow rate from water pump 11 that are required to achieve the various set temperatures. If desired, such variations can be further addressed, for example, by using an optical or other sensor to detect when the steeping level 43 is reached or by programming the control system 15 to calculate when the steeping level 43 is reached based upon any variations in the pump speed which occur during the filling process and or other variables.

Figure 5:
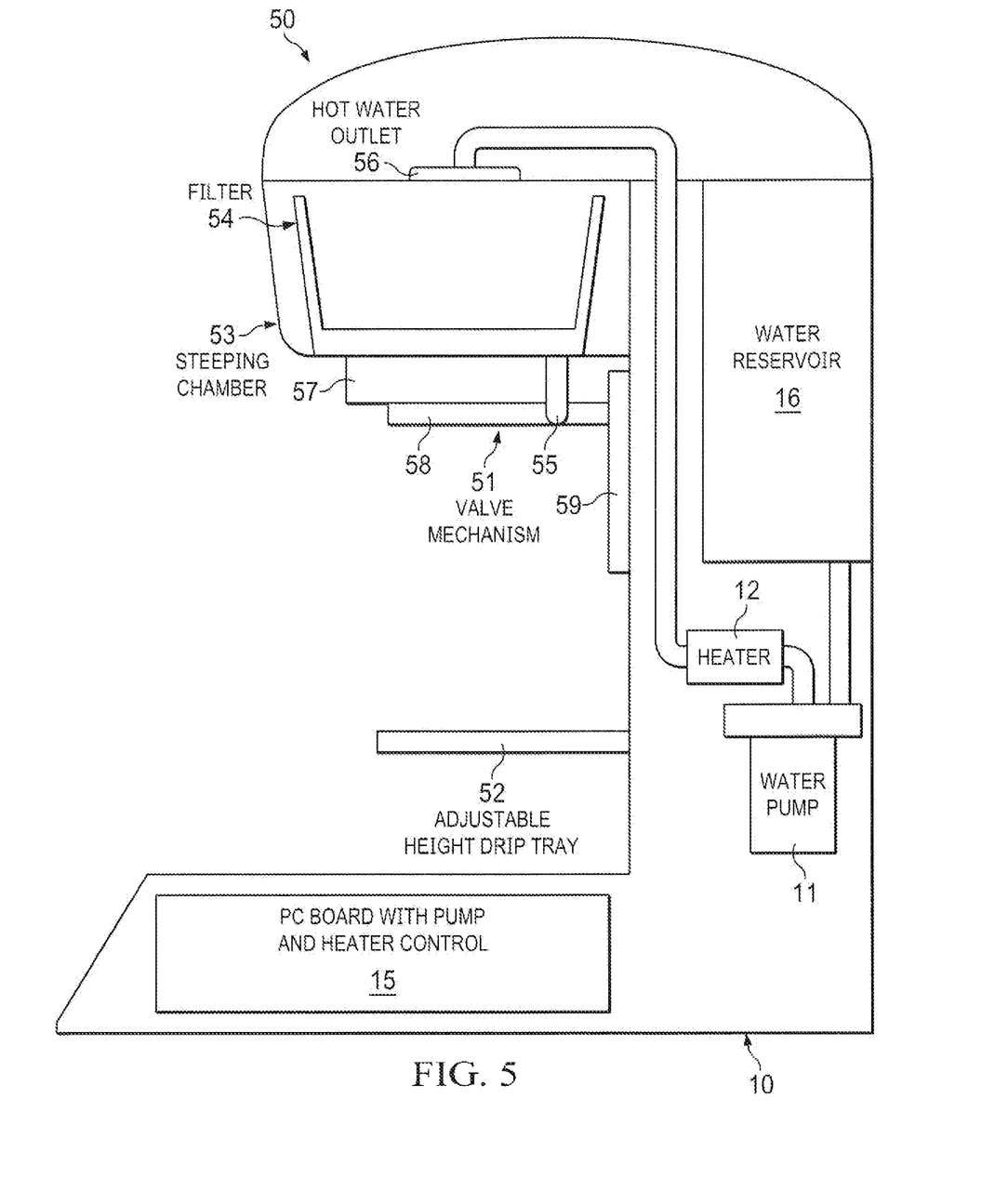
FIG. 5 depicts a third embodiment 50 of the automatic steeping apparatus that includes a steeping chamber 53 and a valve 51 to release the contents of the steeping chamber 53 when the proper steeping time has been completed. This embodiment 50 preferably also includes the use of a variable position drip tray 52 to accommodate different size containers.

FIG. 5 illustrates another embodiment 50 of the automatic steeping apparatus having a valve mechanism 51 which will dispense the tea syrup after it has been steeped for the correct amount of time. In this embodiment 50, the valve mechanism 51 is manually activated when the steeping cycle is complete. The automatic steeping apparatus 50 also preferably comprises: a non-removable steeping chamber 53 which is positioned beneath a hot water discharge 56; a filter element 54 which is removably positionable in the steeping chamber 53 for holding the loose tea or tea bags; and a drip tray 52 which is preferably removably, slideably, or otherwise attached or attachable to the housing beneath the steeping chamber 53 such that the height or spacing of the drip tray 52 beneath the steeping chamber 53 can be adjusted to accommodate, glasses, mugs, cups and/or tea pots of different sizes.

The valve mechanism 51 comprises: a valve seal element 57 for closing a product flow opening in the bottom of the steeping chamber 53; a pivot lever 58 for the seal element 57; a pivot bracket 55 which extends downwardly from the bottom of the steeping chamber 53 for pivotably mounting the pivot lever 58; and a manually operated slide actuator 59 which is provided on the opposite end of the pivot lever 58 and is slideably mounted on the wall of the apparatus housing 10 for manually pivoting the valve seal element 57 upwardly to a closed position and downwardly to an open position.

Figure 6:
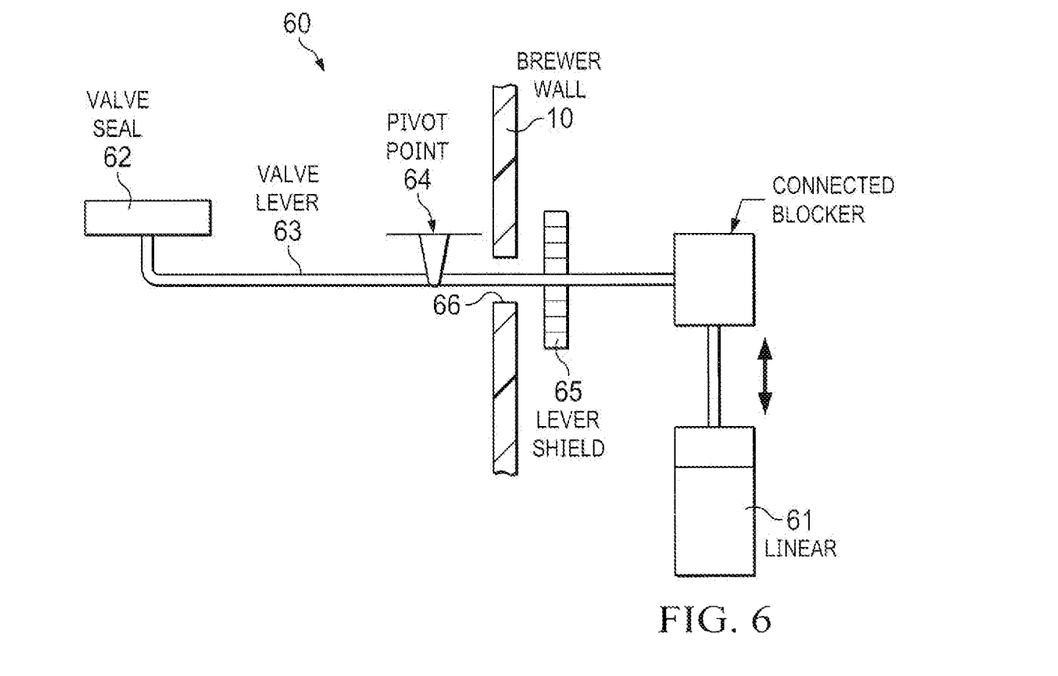
FIG. 6 depicts an embodiment 60 of an automatic valve, for use in apparatus 50 or other embodiments of the inventive steeping apparatus, which will automatically open when the steeping cycle is completed.

Alternatively, the valve mechanism used in the inventive steeping apparatus 50 for dispensing the tea syrup can be an automatic valve mechanism such as, for example, the automatic valve mechanism 60 illustrated in FIG. 6. The automatic valve mechanism 60 comprises: a valve seal element 62 for closing the product flow opening in the bottom of the steeping chamber 53; a pivot lever 63 which extends from the valve seal element 62 through an opening 66 in the housing 10 of the steeping apparatus 50; a pivot bracket 64 for the pivot lever 63 which is secured to the bottom of the steeping chamber 53 to provide a pivot point for the pivot lever 63 outside of the housing 10; a solenoid-operated or other reciprocating or piston element 61 which is positioned inside the housing 10 and is linked to the distal end of the pivot lever 63; and a lever shield 65 which is positioned inside the housing 10 for shielding the components inside the housing 10 from access and exposure via the lever opening 66. When the steeping time and process are complete, the control system 15 activates the solenoid-operated or other reciprocating or piston element 61 to push the distal end of the piston lever 63 upwardly, which in turn pivots the valve seal element 62 downwardly to open the product flow opening in the bottom of the steeping chamber and release the tea syrup product into a glass, mug, cup, tea pot, or other container placed on the drip tray 52. It will again be understood however that this is a single embodiment of a suitable automatic valve mechanism and does not limit the type or structure of the automatic valve mechanism which may be used.

FIGS. 7-10 illustrate another embodiment 70 of the inventive automatic steeping apparatus having a removable steeping chamber 71 which is also preferably interchangeable with one or more other steeping chambers formed of different materials. During operation, the steeping chamber 71 will be removably received and held in place between (a) a pivotable top cover 76 and (b) a lower tray or other overhanging holding structure 72 which extends horizontally from the housing 10. The pivotable top cover 76 of the housing 10 has a pivot hinge 77 on the rearward end thereof. The inventive steeping apparatus 70 also includes a holding element 74 for contacting the top of the steeping chamber 71 and retaining the steeping chamber 71 in proper position. The holding member 74 is pivotably attached to the housing 10 such that the holding member 74 will also be covered by the pivotable top cover 76 of the apparatus 70 when the top cover 76 is closed. The inventive steeping apparatus 70 also comprises a lock for securing (preferably automatically locking) the pivotable top cover 76 in downward closed position, the lock including a release button 75 which can be pressed to release lock and thereby allow the top cover 76 to be pivoted upwardly to its open position to permit the steeping chamber 71 and/or the filter element 14 of the apparatus 70 to be removed.

Figure 7:
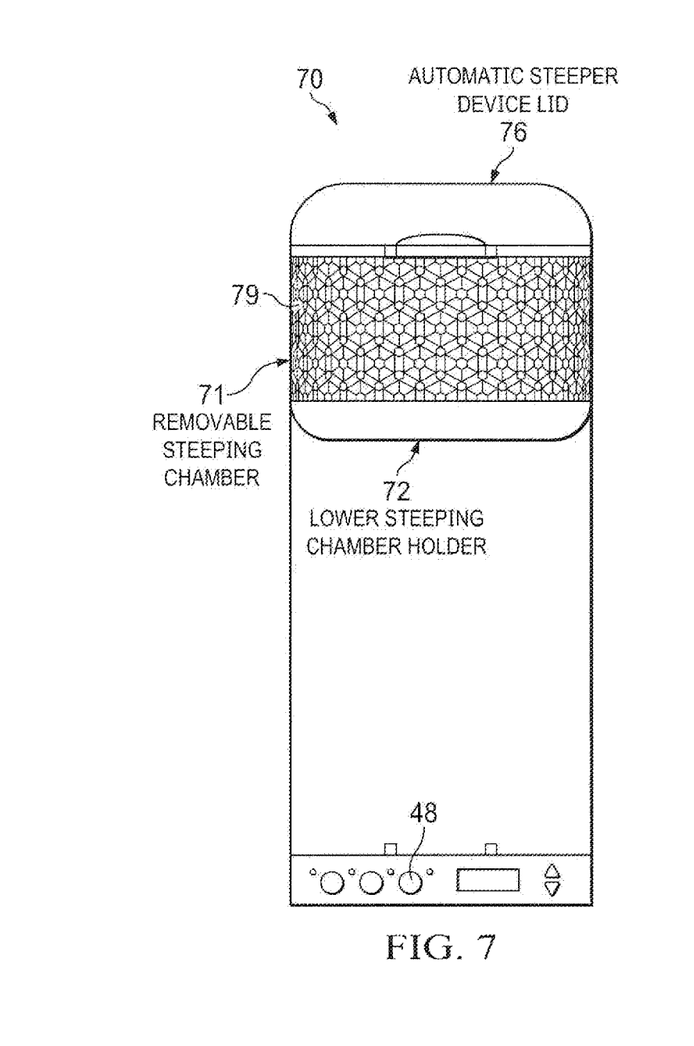
FIG. 7 is a front elevational view a fourth embodiment 70 of the automatic steeping apparatus which preferably accommodates a plurality of removable and interchangeable steeping chambers 71 formed of different materials.

The removable interchangeable steeping chambers 71 used in the inventive automatic steeping apparatus 70 can be formed of any desired type of material. The design of the automatic steeping apparatus 70 which uses the independently pivotable holding member 74 beneath the pivotable top cover 76 allows the steeping apparatus 70 to accommodate interchangeable steeping chambers 71 and other components formed of different materials having significantly different coefficients of thermal expansion and/or other differences which may produce dimensional variations amongst the interchangeable steeping chambers 71 before and/or during operation. By way of example, the different materials can include clay from various locations in the world. An interchangeable steeping chamber 71 formed of clay could be selected by the user, for example, to enhance the flavor and experience of brewing green tea. The porous nature of clay will be particularly desirable for causing the removable steeping chamber 71 to absorb the flavors of green tea.

Ceramic materials can also be used to make steeping chambers 71 used in the various embodiments of the inventive apparatus 70. Ceramic is inert and will not absorb tea flavors. This makes ceramic an ideal steeping chamber material for general purposes.

As another example, glass can also be used for forming the steeping chambers 71. The transparency of glass makes it an ideal choice for the user when steeping floral teas which start in a ball and open to take the shape of a flower. The visual transformation is part of the experience and having a glass steeping chamber 71 will allow the user to enjoy the transformation.

Examples of other materials for the interchangeable steeping chambers 71 include, but are not limited to, cast iron and stainless steel.

These examples illustrate the advantages of having interchangeable steeping chambers 71 made of different materials. These examples are not all inclusive and should not limit the choices that are available for the inventive apparatus and method. The use of removable non-plastic steeping chambers will also have a positive effect when introducing this product to users.

Figure 8:
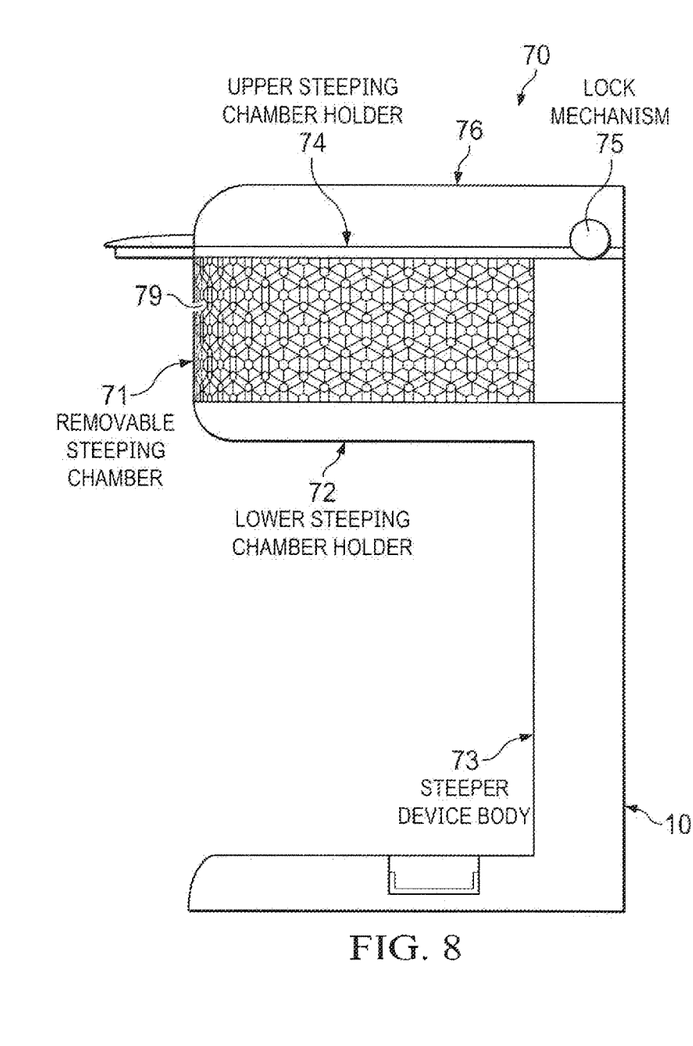
FIG. 8 is a side elevational view of the inventive automatic steeping apparatus 70.
Figure 9:
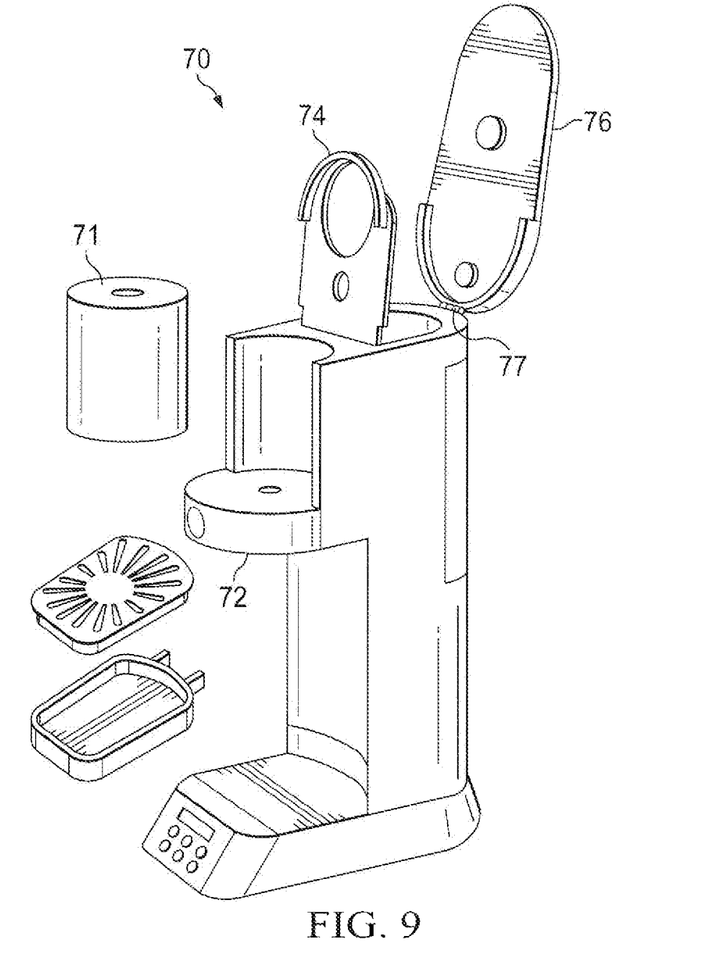
FIG. 9 is a perspective view of the inventive automatic steeping apparatus 70.

The removable steeping chambers 71 can also include decorative finishes 79 as illustrated in FIGS. 7 and 8. These finishes 79 will be similar to those found on tea ports from around the world. These finishes 79 can include but are not limited to printed patterns and embossed designs. The visual decoration 79 will enhance the experience of using the device and also encourage the user to share the experience with family or friends.

Figure 11:
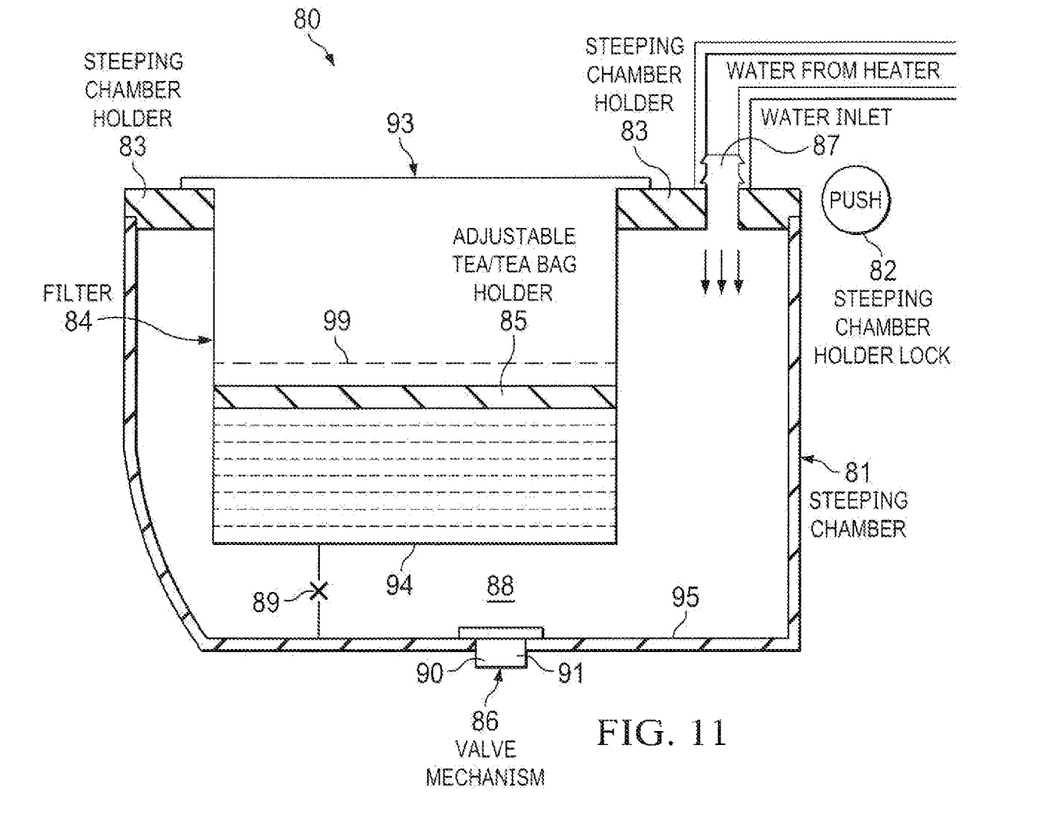
FIG. 11 depicts an alternative automatic embodiment 80 of an assembly for a removable steeping chamber 81 which can be used in the inventive steeping apparatus 70 or in other embodiments of the inventive apparatus and method.

FIG. 11 depicts an alternative automatic embodiment 80 of an assembly for a removable steeping chamber 81 which can be used in the inventive steeping apparatus 70 or in other embodiments of the inventive apparatus and method. The steeping chamber assembly 80 comprises a holding element 83, similar to the holding element 74 described above, which (a) contacts the upper perimeter of the removable steeping chamber 81 to properly position and lock the steeping chamber 81 in place and (b) locates the filter element 84 relative to an upper water discharge 87 such that the water from the water discharges 87 flows downwardly into the steeping chamber 81 outside of the filter element 84, i.e., bypasses the top opening 93 of the filter element 84, and does not contact or wet the tea leaves or tea bags until the volume 88 of the lower portion of the steeping chamber 81 beneath the bottom 94 of the filter element 84 having a predetermined depth 89 is filled with water. The volume 88 will preferably be more than 2 ounces and will more preferably be about 4 ounces.

The steeping chamber assembly 80 also preferably includes an adjustable holding plate or other member 85 which is adjustably positionable in the filter element 84 above the tea or tea bags for preventing the tea or tea bags from floating more than an allowable distance upward as the water level rises in the filter element 84 and submerges the tea. Visible marks, notches, or other indicia can be provided in the filter element 84 for selecting the desired height of the adjustable holding member 85 based upon the amount of tea used.

Figure 13:
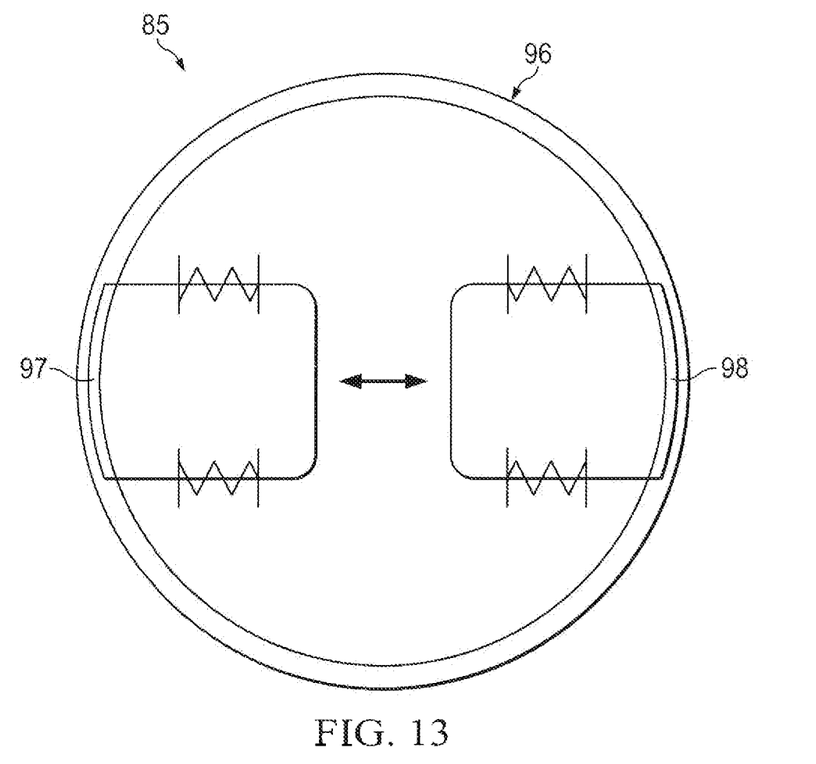
FIG. 13 is a top view of an adjustable holding member 85 used in the inventive steeping apparatus 80 or in other embodiments of the inventive apparatus and method.
Figure 14:
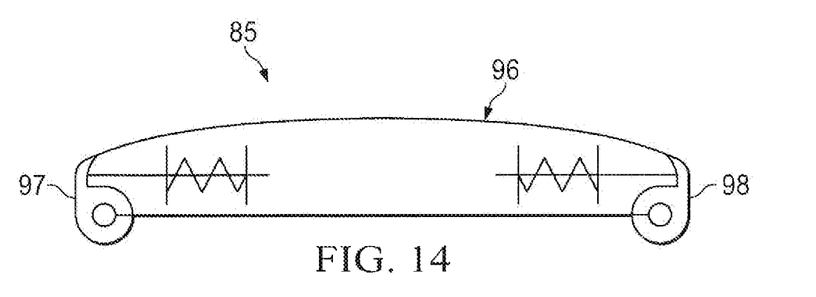
FIG. 14 is a side view of the adjustable holding member 85.

By way of example, but not by way of limitation, an embodiment of the adjustable holding member 85 is illustrated in FIGS. 12 and 13. The adjustable holding member 85 preferably comprises a plate 96 having an opposing pair of spring-loaded gripping seals 97 and 98 mounted thereon which (a) can be squeezed toward each other for insertion into and removal from the filter element 84 and (b) will move outwardly when released into engagement with the interior wall of the filter element 84 to thereby retain the holding member 85 at a selected height for holding the loose tea or one or more tea bags in the filter element 84 below the steeping level 99 during the steeping process.

The automatic steeping chamber assembly 80 also comprises a valve mechanism 86 which is automatically activated by the control system 15 to release the tea syrup when steeping time is completed. The valve mechanism 86 comprises a plug seal element 90 for opening and closing a product flow opening 91 in the bottom of the removable steeping chamber 81. By way of example, but not by way of limitation, the valve element 90 can be automatically raised and lowered to open and close the flow opening 91 using an automatic valve mechanism 60 of the type illustrated in FIG. 6.

Positioning the tea in reference to the steeping chamber 81 and the valve mechanism 86, as well as having the water flow around the filter 84, is beneficial in controlling when the water will come in contact with the tea. The steeping time of the tea can be controlled by controlling the water flow rate going into the steeping chamber 81 and by controlling when the valve mechanism 86 will open. The volume 88 of the lower portion of the steeping chamber 81, as defined by the distance 89 from the bottom 94 of the filter element 84 to the bottom interior surface 95 of the steeping chamber 81, and the valve mechanism 86 can allow water to bypass the filter element 84 for short steeping times that may be shorter than the time it takes to pump all of the water into the steeping chamber 81.

Thus, the present invention is well adapted to carry out the objectives and attain the ends and advantages mentioned above as well as those inherent therein. While presently preferred embodiments and steps have been described for purposes of this disclosure, the invention is not limited in its application to the details of the preferred embodiments and steps. Numerous changes and modifications will be apparent to those in the art. Such changes and modifications are encompassed within this invention as defined by the claims. In addition, unless expressly stated, the phraseology and terminology employed herein are for the purpose of description and not of limitation.

What is claimed:

1. An apparatus for steeping tea comprising:
a housing having a water reservoir and a water heater therein;
a pump in the housing which pumps water from the water reservoir through the water heater to a heated water discharge;
a steeping chamber which is positioned or positionable beneath the heated water discharge;
a filter element having an opening for receiving loose tea or one or more tea bags and the filter element also having a lower end;
the filter element being receivable in an interior of the steeping chamber and the steeping chamber having a fill level for the water discharged from the heated water discharge, the fill level of the steeping chamber being spaced above the lower end of the filter element;
the steeping chamber is a first interchangeable steeping chamber which is removably positionable beneath the heated water discharge;
the first interchangeable steeping chamber is formed of a first material having a first coefficient of thermal expansion;
the apparatus further comprises a second interchangeable steeping chamber which is removably positionable beneath the heated water discharge;
the second interchangeable steeping chamber is formed of a second material having a second coefficient of thermal expansion which is different from the first coefficient of thermal expansion of the first material; and
the apparatus further comprising a holding member which is removably receivable on an upper end of the first interchangeable steeping chamber and on an upper end of the second interchangeable steeping chamber, the holding member being configured to both (i) accommodate the first coefficient of thermal expansion of the first material to hold the first interchangeable steeping chamber in position beneath the heated water discharge and (ii) accommodate the second coefficient of thermal expansion of the second material to hold the second interchangeable steeping chamber in position beneath the heated water discharge when the second interchangeable steeping chamber is interchanged with the first interchangeable steeping chamber.

2. The apparatus of claim 1 wherein the first material is clay and the second material is glass, stainless steel, ceramic or cast iron.

3. The apparatus of claim 1 wherein each of the first and second interchangeable steeping chambers is removably positionable between (i) a pivotable top cover of the housing and (ii) a lower support which extends horizontally from the housing, and wherein the holding member is pivotably attached to the housing such that the holding member will be covered by the pivotable top cover when the pivotable top cover is pivoted downwardly over either of the first or second interchangeable steeping chambers.

* * * * *